United States Patent [19]

Finsterwalder et al.

[11] 4,023,514
[45] May 17, 1977

[54] LIQUID STORAGE FLOAT FORMED OF STEEL CONCRETE OR PRESTRESSED CONCRETE

[75] Inventors: Ulrich Finsterwalder, Munich-Obermenzing; Klemens Finsterwalder, Socking near Starnberg, both of Germany

[73] Assignee: Dyckerhoff & Widmann Aktiengesellschaft, Munich, Germany

[22] Filed: Dec. 18, 1975

[21] Appl. No.: 642,318

[30] Foreign Application Priority Data

Dec. 24, 1974   Germany .......................... 2461462

[52] U.S. Cl. .............................................. 114/256
[51] Int. Cl.² ....................................... B63B 35/44
[58] Field of Search ............... 114/.5 T, .5 R, 65 A, 114/74 T, 74 A

[56] References Cited

UNITED STATES PATENTS

| | | | |
|---|---|---|---|
| 2,631,558 | 3/1953 | Harris | 114/.5 T |
| 2,655,888 | 10/1953 | Alcorn | 114/.5 T |
| 3,076,205 | 2/1963 | Schultz | 114/.5 T |
| 3,429,128 | 2/1969 | Stafford et al. | 114/.5 T |
| 3,498,249 | 3/1970 | Jones | 114/65 A |
| 3,507,238 | 4/1970 | Chow | 114/.5 T |
| 3,630,161 | 12/1971 | Georgii | 114/.5 T |
| 3,943,724 | 3/1976 | Banzoli | 114/.5 T |

*Primary Examiner*—Trygve M. Blix
*Assistant Examiner*—Stuart M. Goldstein
*Attorney, Agent, or Firm*—Toren, McGeady and Stanger

[57] ABSTRACT

A float for the intermediate storage at sea of crude oil, liquefied gas and the like, is formed of a toroidal body of revolution having a vertical axis. The toroidal body consists of a bottom plate in a form of a shallow annular shaped dish closed across its top by a circular cover plate. Partitions divide the interior of the body into individual compartments. Extensions projecting radially outwardly from the circumferential pheriphery of the body form docking surfaces and can house driving engines for propelling or positioning the float.

14 Claims, 3 Drawing Figures

LIQUID STORAGE FLOAT FORMED OF STEEL CONCRETE OR PRESTRESSED CONCRETE

SUMMARY OF THE INVENTION

The present invention is directed to a float formed of steel concrete or prestressed concrete and used as an intermediate storage container for liquids, such as storing crude oil, liquefied gas and the like at sea.

In the offshore exploration for oil, drilling vessels or offshore drilling rigs which are supported on the ocean floor are used to drill bore holes. Vessels must be anchored against wind and waves and, in heavy seas, drilling must be stopped and the drilling equipment pulled out to avoid damage. Where offshore drilling rigs are used, they must be constructed very elaborately to withstand stormy seas, as many accidents have shown.

The crude oil is delivered through pipe lines laid on the ocean floor with the flow from a number of different bore holes being combined through feed pipes into the pipe line. The pipe line is laid directly to the coast or, if pipe lines are too costly because of the great distance involved, to stationary or floating outlets for tankers in which the crude oil is shipped. Apart from the fact that it is often difficult or even impossible for the tankers to take on the crude oil in heavy seas, such outlets are unsatisfactory from an enviornmental point of view, because contamination of the sea by the crude oil can hardly be avoided. Furthermore, the crude oil can only be removed if a tanker is connected to the outlet, there is no provision for storage space.

It has also been known to provide oil tanks in the vicinity of offshore drilling locations for the intermediate storage of the crude oil. The oil is fed from the undersea wells in a continuous manner into the oil tanks and is then removed and loaded into tankers. Such oil tanks can either be located on the ocean floor or designed as floats or connected to drilling rigs.

Though the use of steel concrete or prestressed concrete for such tanks has a number of advantages over steel, concrete has a very high volumetric weight for use as a float so that the shape and size of the float must be selected in a certain relation to its volume and loading capacity.

Oil tanks of this type having a rectangular or circular cross-section have been used. Due to their compact design, the tanks have a relatively great draft. Undersea oil fields in which such drilling operations are conducted are primarily found in coastal shelves where there is only a shallow draft. As a result, it is not economical to exploit such oil fields with the presently available techniques, since there are no consumers nearby or the liquefying plants which require ship transportation of the oil do not exist or are too far away. Another reason for not exploiting such fields is that it does not pay to lay lines to the liquefying plants on land because of the small size of the oil field.

Accordingly, it is the primary object of the present invention to provide a floating container formed of steel concrete or prestressed concrete for the intermediate storage of crude oil, liquefied gas and the like which is favorable in view of the steel and concrete used, both in terms of static concept and material employed, as well as in terms of the floating properties of the container. Such a container should have a very low draft with a great carrying capacity.

In accordance with the present invention, a container with a very low draft yet a high carrying capacity is attained by providing a floating container shaped as a toroidal body of revolution with a vertical axis. The lower portion of the body is formed by a continuously curved bottom plate which provides a shallow annular dish joined about its upper edges to a substantially planar circular cover plate forming a closure for the annular dish.

The interior of the container can be divided by curved partitions into individual compartments. The partitions can be curved in both the horizontal and vertical directions, such as a number of walls formed as concentric rings. Alternatively, the partitions can be provided extending in the radial direction of the container.

The cover plate can have an opening in its central region spaced inwardly from the radially inner edge of the annular dish.

At least two diametrically opposed points on the outer circumference of the floating container can be provided with radially outwardly projecting extensions. Further, two adjacent extensions spaced angularly apart can be arranged so that their radially outer surfaces form docking surfaces for the float. Furthermore, driving means can be incorporated into the extensions for moving and positioning the float.

The particular advantage of the floating container formed in accordance with the present invention is because of its annular design, that its greatest height is in the region which has a relatively great radial distance from the center of the float and, therefore, extends over a considerable length, that is, the length of the circumferences of the container. This particular arrangement results in a high load capacity with a relatively low draft.

The special form of the container leads to the use of small radii of curvature for the bottom plate of the container, so that the static carrying capacity of the bottom part which acts like a dish, is increased. In this way an optimum ratio is achieved between the load capacity and the material used in constructing the floating container, which makes it particularly suitable for use in coastal areas having a low draft.

The top surface of the container, that is, its cover, can be used for various purposes. The cover can support various operating devices if the floating container is used as a drilling rig mounting drilling tools used for sinking bore holes which tools can be lowered to the ocean floor through a central opening in the cover. Further, a gas liquefying plant can be constructed on the cover for the economical exploitation of natural gas deposits found in the shallow waters.

By locating driving means in the extensions located about the outer periphery of the floating container, which extensions can also form docking surfaces, they afford the ability to hold the floating container in a position against the action of wind and waves and also to move or turn the container into the proper wind direction for landing maneuvers. Furthermore, the driving means make it possible for the container to move under its own power to a new location if the natural gas or oil field becomes exhausted. The floating container can also be used as a reloading point or as a floating liquefying plant for natural gas.

The various features of novelty which characterize the invention are pointed out with particularity in the claims annexed to and forming a part of this disclosure.

For a better understanding of the invention, its operating advantages and specific objects attained by its use, reference should be had to the accompanying drawings and descriptive material in which there is illustrated and described a preferred embodiment of the invention.

DETAILED DESCRIPTION OF THE INVENTION

Figure 1:
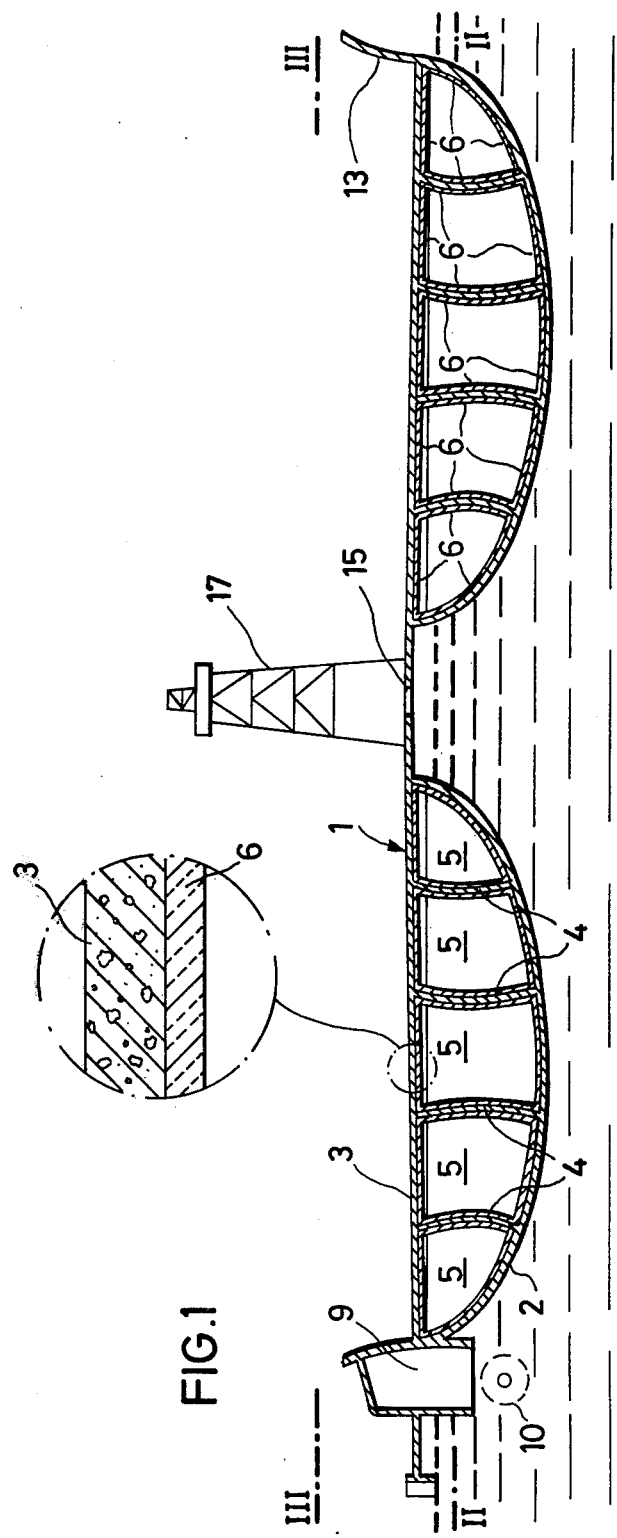
FIG. 1 is a vertical sectional line, taken along the line I—I in FIG. 2, through a floating container embodying the present invention.

In the drawing the floating container is arranged to hold liquefied gas.

Figure 2:
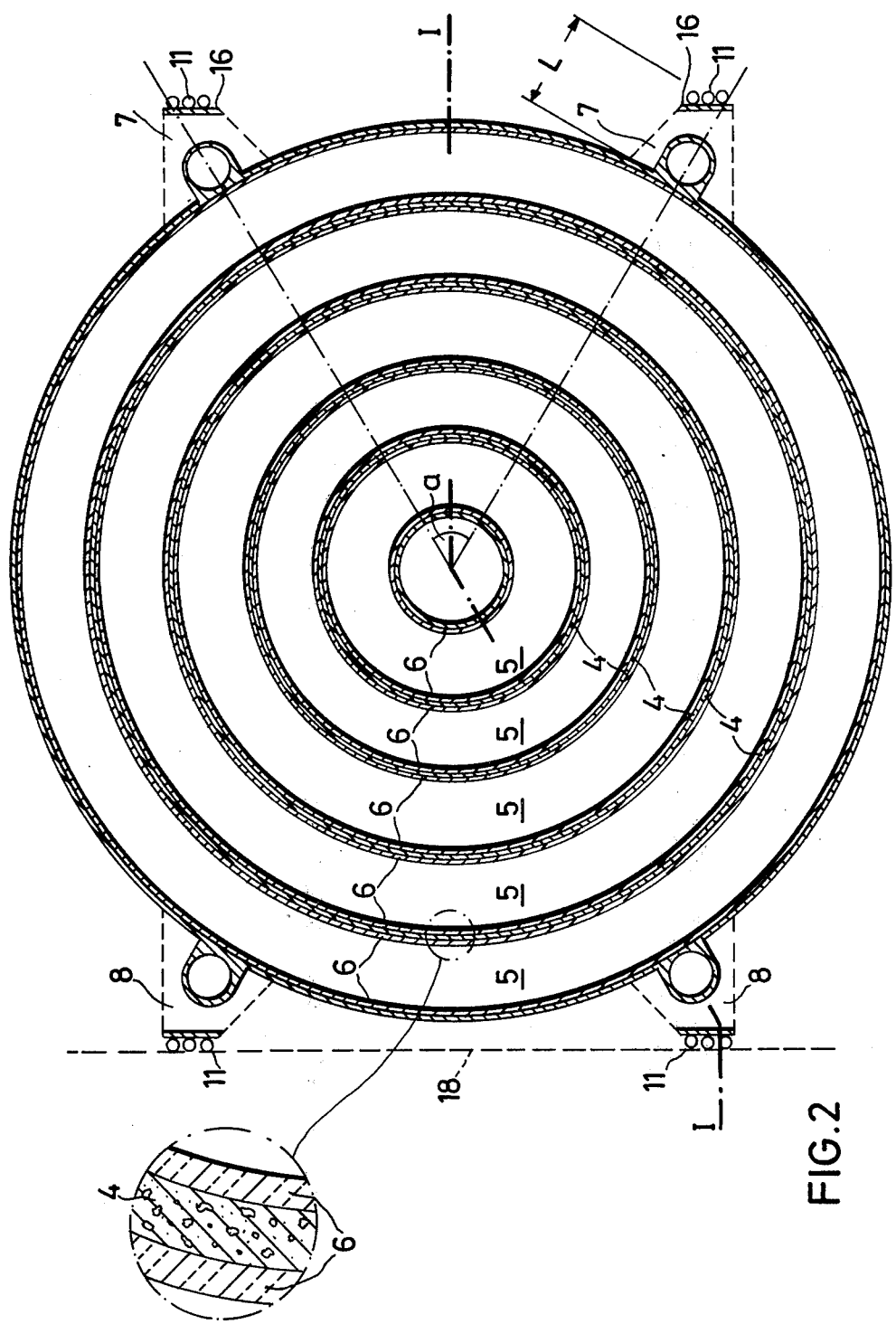
FIG. 2 is a horizontal sectional view of the floating container taken along the line II—II in FIG. 1.

The float or floating container 1 is configured as a toroidal body of revolution with a vertical central axis. The container consists of a continuously curved bottom plate 2, preferably in the form of a half ellipse, which defines a shallow annular dish. The dish or bottom plate 2 has a radially inner edge or circumference and a radially outer edge or circumference. A planar circular cover plate forms a closure for the annular dish and spans the open space defined by the radially inner edge of the bottom plate. As shown in FIG. 2, the interior of the container is subdivided by concentrically arranged ring-shaped walls 4 into individual compartments 5. As can be seen from FIGS. 1 and 2, the ring-shaped walls 4 have a double curvature, due to their concentric arrangement and to the curved configuration in the vertical direction, note FIG. 1. Accordingly, the ring-shaped walls act like dishes and can withstand deformation due to temperature differences by changing their radius of curvature. This feature is of particular importance when the individual compartments are used to store liquefied gas.

The surfaces of the bottom plate 2, the cover plate 3, and the ring-shaped walls 4 within the compartments 5 are lined with a known insulation 6 to prevent the passage of cold, since the liquefied gas is stored and shipped at a temperature of −162° C.

Figure 3:
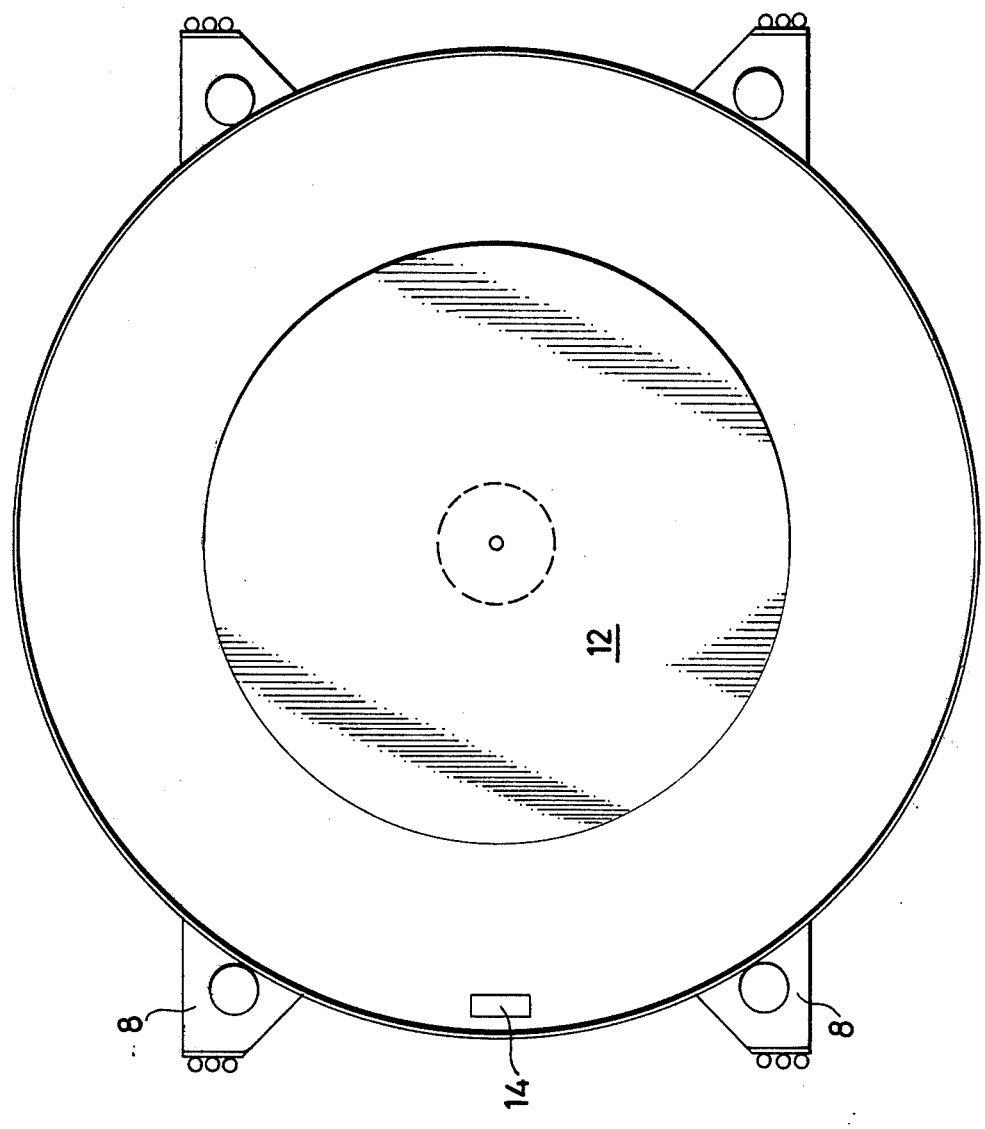
FIG. 3 is a top view of the floating container as indicated by the line III—III in FIG. 1.

On the radially outer edge or circumference of the container 1, outwardly projecting extensions 7, 8 are provided in which driving engines, located within space 9, with propellers 10 can be housed. As shown in FIGS. 2 and 3, two extensions 7 are provided on one-half of the container and two extension 8 are provided on the other half. The pair of extensions on each half are spaced angularly apart by an angle a and project radially outwardly from the outer circumference of the container by a distance L. As a result, a rectilinear line 18, indicated in dashed lines in FIG. 2, provides a docking surface against which the side of a tanker can be placed without contacting the periphery of the container. The radially outer surfaces 16 of the extensions which afford the docking surfaces are provided with impact devices 11 which protect the extensions during docking operations.

Positioned on the cover plate 3 of the floating container 1 is a central region 12, note FIG. 3, on which a liquefying plant for natural gas can be built. About its outer circumferential edge, the floating container is provided with a wave breaker 13 which can extend over a portion or for the entire circumference of the container. For the sake of clarity, structures which are used as a bridge or as a housing for the crew are not shown in the drawings. In FIG. 3 located between the extensions 8 is a plant 14 (shown schematically in FIG. 3) for transferring cargo.

While the floating container illustrated in the drawings is used for storing liquefied gas it can be used equally advantageously as a drilling rig and as a storage tank for crude oil. As shown in FIG. 1, a drilling rig 17 can be positioned on the central portion of the cover 3 instead of a liquefying plant with the drilling tools extending through an opening 15 in the center of the cover and passing downwardly through the space defined by the radially inner edge of the bottom plate.

While a specific embodiment of the invention has been shown and described in detail to illustrate the application of the inventive principles, it will be understood that the invention may be embodied otherwise without departing from such principles.

What is claimed is:

1. A floating container forming a storage space for the intermediate storage of liquids such as crude oil, liquefied gas and the like, wherein the improvement comprises a toroidal body of revolution having a vertical axis, said body comprising a bottom plate having continuously curving surfaces forming a shallow annular shaped dish, said bottom plate having a radially inner edge and a radially outer edge with the radially inner edge spaced radially outwardly from the vertical axis, a substantially planar circular cover plate extending around the radially outer edge of said bottom plate and forming a closure for the shallow annular shaped dish formed by said bottom plate, said cover plate supported on the radially inner edge and the radially outer edge of said bottom plate, said bottom plate and cover plate combining to form a closed annular shaped space within said toroidal body, said bottom plate and cover plate being formed of concrete.

2. A floating container, as set forth in claim 1, wherein said bottom plate and cover plate are formed of steel concrete.

3. A floating container, as set forth in claim 1, wherein said bottom plate and cover plate are formed of prestressed concrete.

4. A floating container, as set forth in claim 1, wherein partitions are located within the annular shaped space within said container and extend between said bottom plate and said cover plate dividing the annular shaped space into a plurality of separate compartments.

5. A floating container, as set forth in claim 4, wherein said partitions extend upwardly from said bottom plate to said cover plate and are curved in the vertical and horizontal directions.

6. A floating container, as set forth in claim 5, wherein said partitions are concentrically arranged ring-shaped walls.

7. A floating container, as set forth in claim 4, wherein said partitions extend radially of the vertical axis of said toroidal body from the radially inner edge to the radially outer edge of said bottom plate.

8. A floating container, as set forth in claim 1, wherein said radially inner edge of said bottom plate defines a central opening through said bottom plate, and said cover plate spans the central opening through said bottom plate and has an opening therethrough spaced radially inwardly from the radially inner edge of said bottom plate.

9. A floating container, as set forth in claim 1, wherein at least two extensions are attached to and extend outwardly from said toroidal body at diametrically opposite locations on the radially outer edge of said bottom plate.

10. A floating container, as set forth in claim 9, wherein two said extensions are spaced angularly apart on one-half of said toroidal body and have a radial length extending outwardly from the radially outer edge of said bottom plate so that the rectilinear line extending between the radially outer surfaces of the two said extensions on the same half of said toroidal body are spaced outwardly from the outer circumferential periphery of said toroidal body and the radially outer surfaces of the two said extensions form, in combination, docking surfaces for the floating container.

11. A floating container, as set forth in claim 9, wherein driving engines for moving the float are mounted in said extensions.

12. A floating container, as set forth in claim 10, wherein impact devices are secured to the radially outer surfaces of said extensions which form docking surfaces.

13. A floating container, as set forth in claim 4, wherein insulation lines the interior surfaces of the individual cmpartments to prevent the passage of cold outwardly from the compartments.

14. A floating container, as set forth in claim 1, wherein said bottom plate has the shape of half an ellipse.

* * * * *